US008328395B2

(12) United States Patent
Kato et al.

(10) Patent No.: US 8,328,395 B2
(45) Date of Patent: Dec. 11, 2012

(54) LIGHT EMITTING APPARATUS, SURFACE LIGHT SOURCE APPARATUS, DISPLAY APPARATUS, AND LUMINOUS FLUX CONTROL MEMBER

(75) Inventors: Hideaki Kato, Saitama (JP); Yasuyuki Fukuda, Saitama (JP)

(73) Assignee: Enplas Corporation, Saitama (JP)

( * ) Notice: Subject to any disclaimer, the term of this patent is extended or adjusted under 35 U.S.C. 154(b) by 50 days.

(21) Appl. No.: 13/165,174

(22) Filed: Jun. 21, 2011

(65) Prior Publication Data
US 2011/0310615 A1 Dec. 22, 2011

(30) Foreign Application Priority Data
Jun. 21, 2010 (JP) .................................. 2010-140762

(51) Int. Cl.
*F21V 5/04* (2006.01)
(52) U.S. Cl. .......... 362/296.01; 362/311.02; 362/311.06
(58) Field of Classification Search ............. 362/269.01, 362/555, 583, 307, 308, 309, 311.02, 311.06, 362/328
See application file for complete search history.

(56) References Cited

U.S. PATENT DOCUMENTS

| 6,598,998 B2 * | 7/2003 | West et al. ..................... 362/308 |
| 7,800,124 B2 * | 9/2010 | Urano et al. ............. 362/311.06 |
| 2012/0155091 A1 * | 6/2012 | Takatori ........................ 362/308 |

FOREIGN PATENT DOCUMENTS
JP 2007-048883 A 2/2007

* cited by examiner

*Primary Examiner* — David V Bruce
(74) *Attorney, Agent, or Firm* — Washida & Associates

(57) ABSTRACT

A light emitting apparatus emits light emitted from a light emitting element (200) mounted on a substrate (300) via a luminous flux control member (100). The luminous flux control member (100) has a bottom surface section (101) opposite to the substrate (300), an input surface section (106) for causing the light emitted from a light emitting element (200) to enter inside the input surface section (106), a light control output surface section (102) for refracting the light having entered from the input surface section (106) and outputting the light outside, and two or more leg sections (103) are formed to project outward from the bottom surface section (101) inside a circle with a circumference on which a position where the amount of light reflected by the light control output surface section (102) and yet reaching the bottom surface section (101) peaks is located, and attached to the substrate (300).

6 Claims, 14 Drawing Sheets

LIGHT EMITTING APPARATUS, SURFACE LIGHT SOURCE APPARATUS, DISPLAY APPARATUS, AND LUMINOUS FLUX CONTROL MEMBER

CROSS REFERENCE TO RELATED APPLICATIONS

The disclosure of Japanese Patent Application No. 2010-140762, filed on Jun. 21, 2010, including the specification, drawing and abstract, is incorporated herein by reference in its entirety.

TECHNICAL FIELD

The present invention relates to a light emitting apparatus, a surface light source apparatus, a display apparatus, and a luminous flux control member. More specifically, the present invention relates to a light emitting apparatus used as various types of illuminations such as a light source of backlight for illuminating, in a planar fashion, a liquid crystal display panel from the back side, a general indoor illumination, and the like, a surface light source apparatus that uses the light emitting apparatus and is used for various types of illuminations, a display apparatus used in combination with an illumination-target member using the surface light source apparatus as an illumination means, and a luminous flux control member for constituting the surface light source apparatus and the display apparatus.

BACKGROUND ART

As an illuminating device of a liquid crystal display monitor used in a personal computer, a television, and the like, there is conventionally known a surface light source apparatus using a plurality of LEDs as point light sources.

In the surface light source apparatus, a plurality of LEDs are provided in a matrix shape on the back surface of a plate-like diffusion member, which has approximately the same shape as the liquid crystal display panel of a liquid crystal display monitor. Light emitted from the LEDs enters inside the diffusion member from the back surface of the diffusion member and is caused to emit from an output surface which is a front surface of the diffusion member. The surface light source apparatus can illuminate, in a planar fashion, a liquid crystal display panel from the back side by the light output from the diffusion member.

As a surface light source apparatus using the LEDs as a light source, there is known a surface light source apparatus which combines the LEDs with a luminous flux control member and controls a traveling direction of the light emitted from the LEDs by the luminous flux control member (for example, patent literature 1).

The luminous flux control member is provided with leg sections for fixing the luminous flux control member to a substrate after the luminous flux control member is aligned with the LEDs.

Patent Literature 1: Japanese Patent Application Laid-Open No. 2007-48883

SUMMARY OF INVENTION

However, in patent literature 1, the leg sections are provided to the outermost side of a main body of the luminous flux control member. Therefore, since the area required to provide the luminous flux control member on a substrate for mounting cannot be made small, a problem arises that the number of substrates for mounting which can be formed from a single substrate member cannot be increased. Further, in patent literature 1, a problem also arises that a crack is liable to be produced in the leg sections of the luminous flux control member because, when the luminous flux control member is attached to the substrate for mounting, the stress to apply to the leg sections at the time of expansion increases by the difference in the degree of thermal expansion between the substrate for mounting and the luminous flux control member.

It is therefore an object of the present invention to provide a luminous flux control member that is capable of making a area in which the luminous flux control member is attached to a substrate small and reducing influence upon optical characteristics by providing leg sections inside a circle with a circumference on which a position where the amount of light reflected by a light control output surface section and yet reaching a bottom surface section peaks is located, and, furthermore, to provide a light emitting apparatus, a surface light source apparatus, and a display apparatus which are less influenced by difference in the degree of thermal expansion between a substrate and the luminous flux control member.

A light emitting apparatus according to the present invention for emitting light from a light emitting element mounted on a substrate via a luminous flux control member has: a bottom surface section that opposes the substrate; an input surface section that is formed by forming an inward recess in the bottom surface section, in a position right above the light emitting element, and that receives as input light emitted from the light emitting element; a light control output surface section that refracts the light having entered from the input surface section, and emits the light outside; and two or more leg sections that are formed to project outward from the bottom surface section, inside a circle with a circumference on which a position where an amount of light reflected by the light control output surface section and yet reaching the bottom surface section peaks and that are attached to the substrate.

A surface light source apparatus according to the present invention has: the above light emitting apparatus; a light diffusion member provided above the light control output surface section side of the luminous flux control member; and a light reflection sheet for covering the substrate, holes being formed in the light reflection sheet to prevent interference between positions where the leg sections of the luminous flux control member are attached to the substrate and the light emitting element.

A display apparatus according to the present invention has the above surface light source apparatus and an illumination-target member to which light from the surface light source apparatus is emitted.

A luminous flux control member according to the present invention for receiving as input light from a light emitting element and outputting the light after controlling the traveling direction of the light has: a bottom surface section opposing a substrate; an input surface section formed by forming an inward recess in the bottom surface section in a position right above the light emitting element for causing the light emitted from the light emitting element to enter inside the input surface section; a light control output surface section that refracts the light having entered from the input surface section and emits the light outside; and two or more leg sections that are formed to project outward from the bottom surface section, inside a circle with a circumference on which a position where an amount of light reflected by the light control output surface section and yet reaching the bottom surface section peaks is located and attached to the substrate.

According to the present invention, the area in which the luminous flux control member is attached to a substrate can be made small and the influence upon optical characteristics can be reduced by providing leg sections inside a circle on the circumference of which a position where the amount of light reflected by a light control output surface section and yet reaching a bottom surface section peaks is located, and furthermore easy occurrence of a crack in the leg sections of the luminous flux control member by the influence of difference in the degree of thermal expansion between a substrate and the luminous flux control member can be suppressed.

DESCRIPTION OF EMBODIMENT

An embodiment of the present invention will be described below in detail with reference to the drawings.

Embodiment

[Arrangement of Luminous Flux Control Member]

Figure 1:
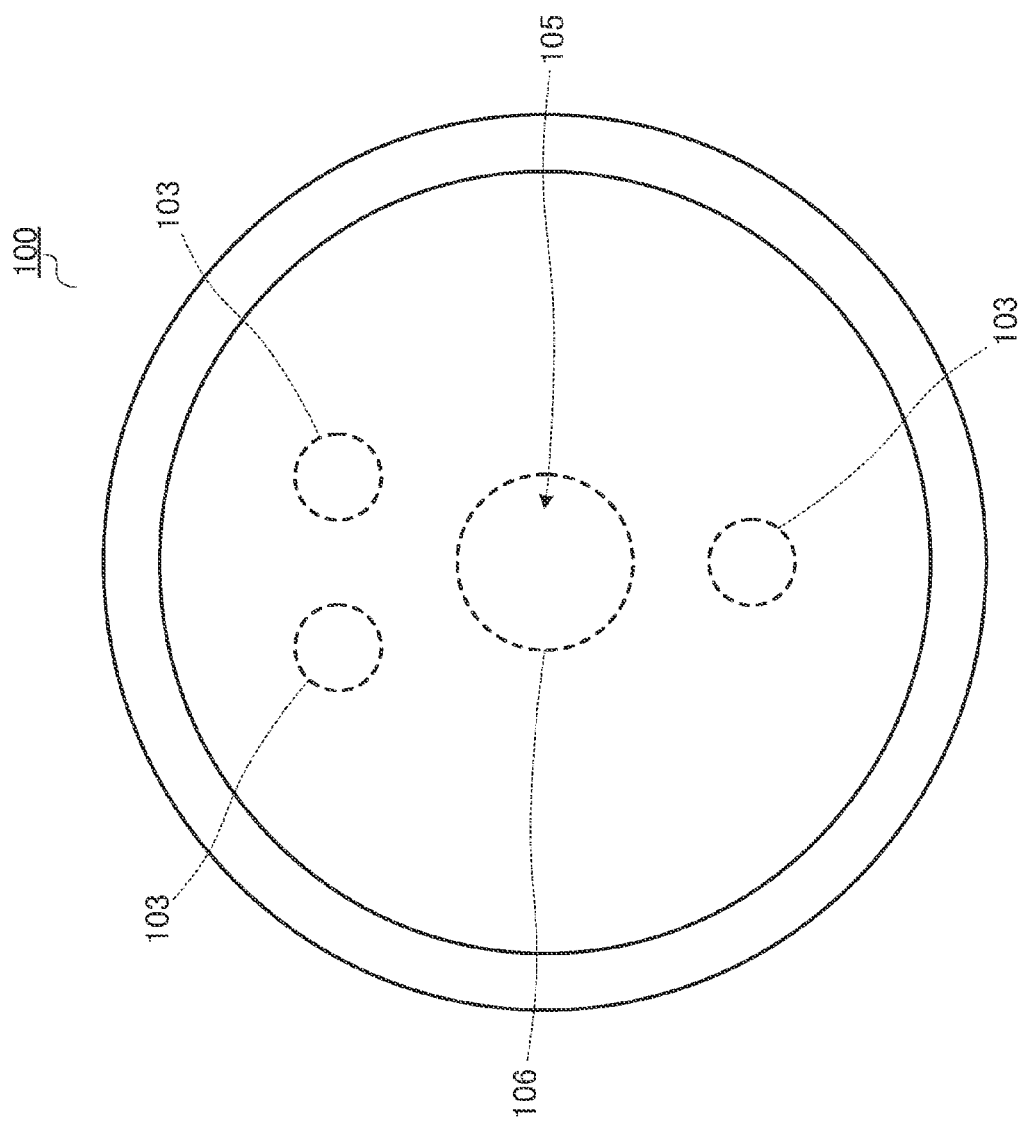
FIG. 1 is a plan view of a luminous flux control apparatus according to an embodiment of the present invention.
Figure 2:
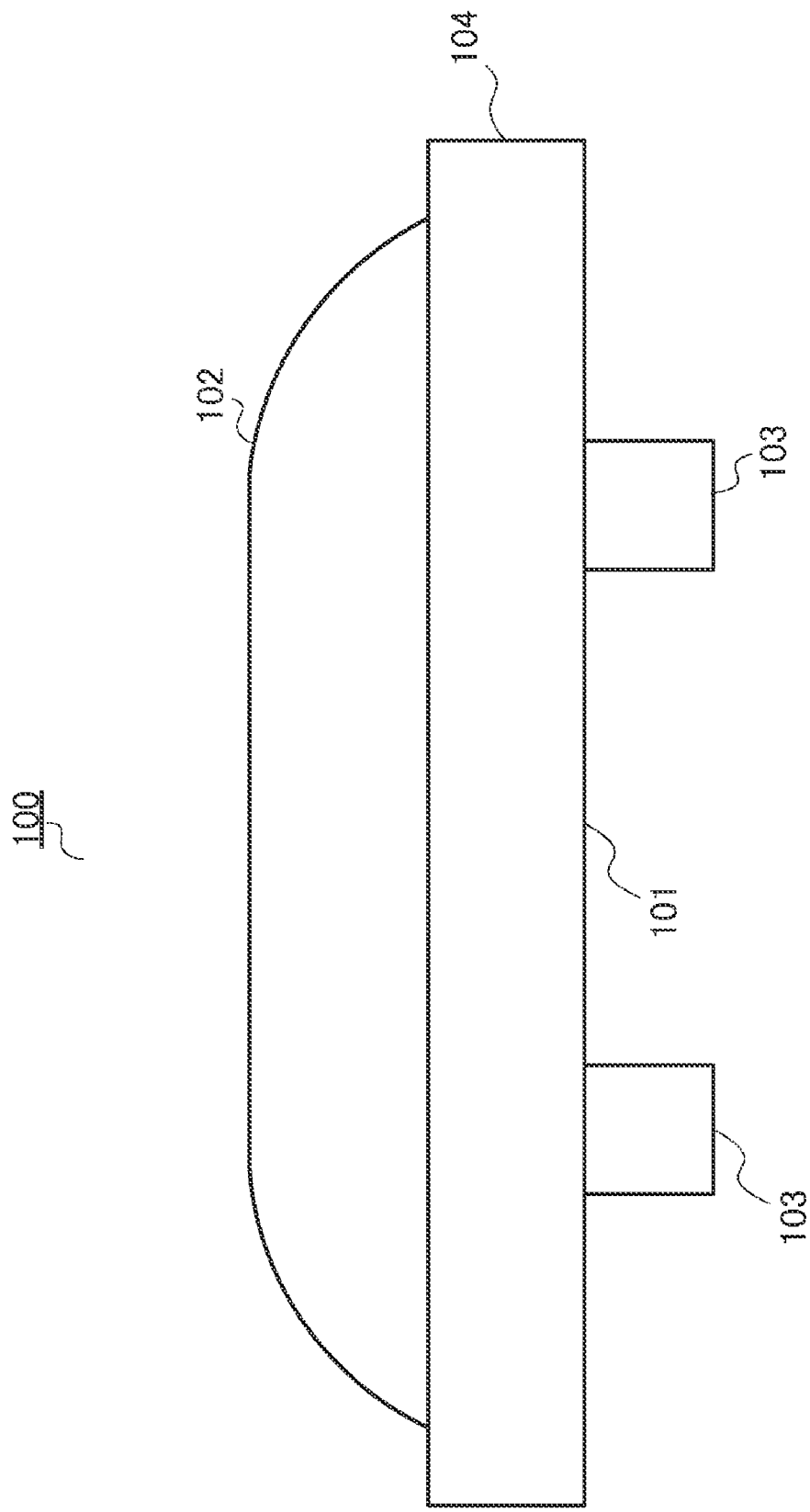
FIG. 2 is a front view of the luminous flux control apparatus according to an embodiment of the present invention.
Figure 3:
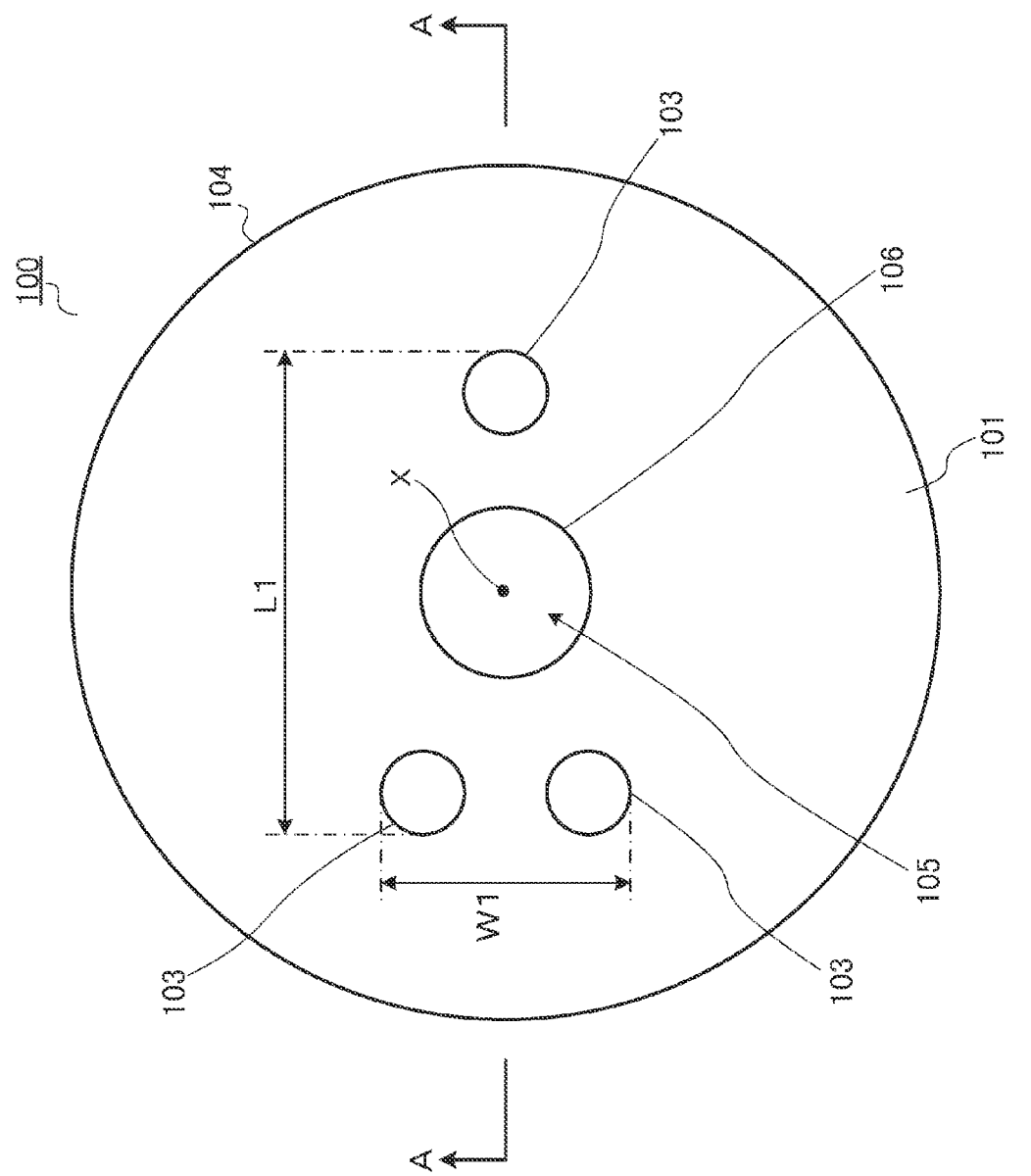
FIG. 3 is a bottom surface view of the luminous flux control apparatus according to an embodiment of the present invention.
Figure 4:
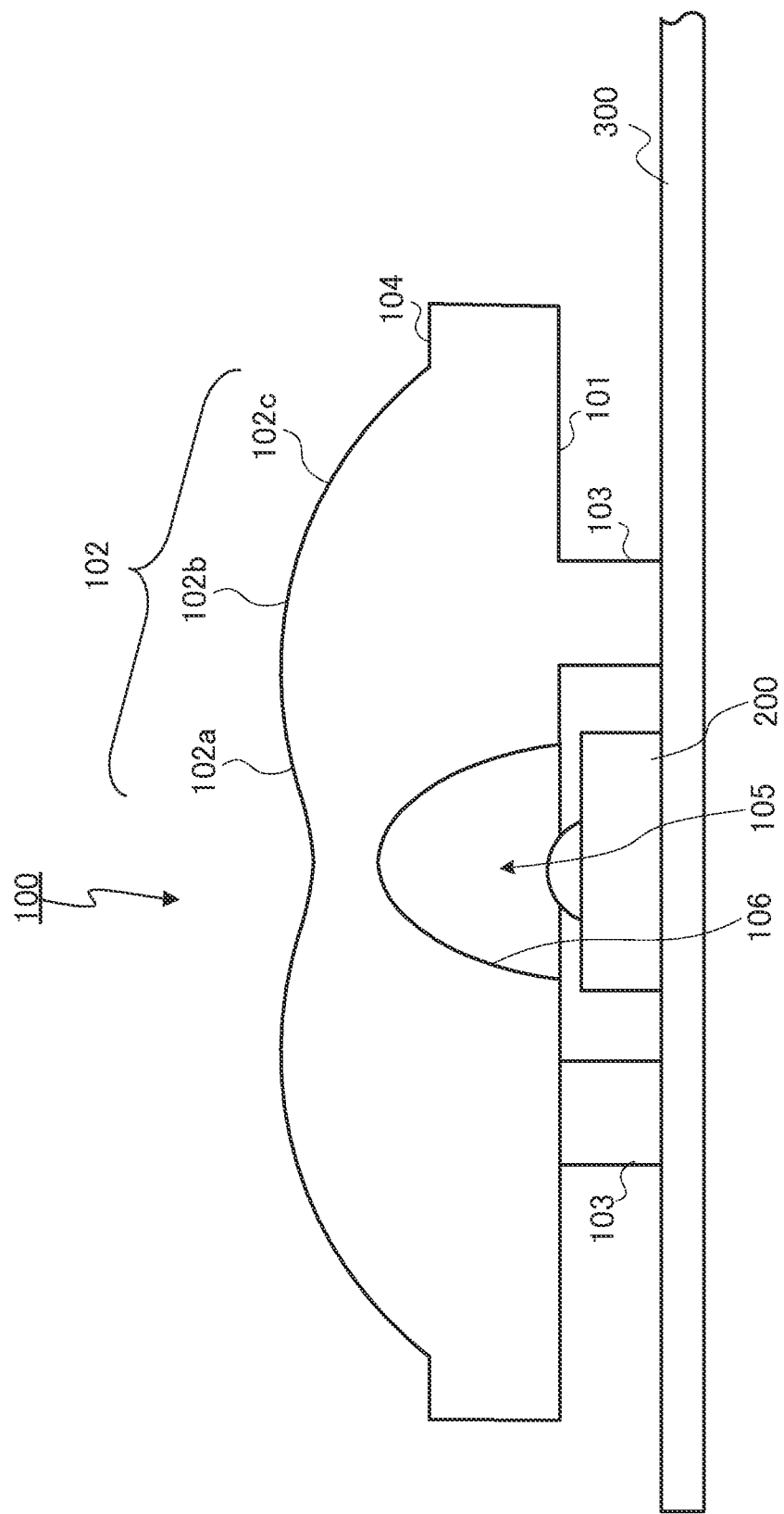
FIG. 4 is a cross-sectional view taken along an A-A line in FIG. 3.

An arrangement of luminous flux control member 100 will be described below in detail. FIG. 1 is a plan view of luminous flux control member 100 according to an embodiment of the present invention. FIG. 2 is a front view of luminous flux control member 100 according to an embodiment of the present invention. FIG. 3 is a bottom surface view of luminous flux control member 100 according to an embodiment of the present invention. Further, FIG. 4 is a cross-sectional view taken along an A-A line in FIG. 3. Note that FIG. 4 shows also light emitting element 200 and substrate 300 together.

Luminous flux control member 100, light emitting element 200, and substrate 300 constitute a light emitting apparatus.

Luminous flux control member 100 is a lens that is configured such that after light emitted from external light emitting element 200 such as an LED or the like enters inside luminous flux control member 100, luminous flux control member 100 emits the light toward an illumination-target surface by controlling the traveling direction of the light, and is, for example, an aspherical lens. Luminous flux control member 100 is formed of a transparent resin material, for example, PMMA (polymethyl methacrylate), PC (polycarbonate), EP (epoxy resin) and the like or a transparent glass and has light transmission.

Luminous flux control member 100 has bottom surface section 101, light control output surface section 102, leg sections 103, collar section 104, recess section 105, and input surface section 106.

Bottom surface section 101 has an approximately circular shape and has recess section 105 in a central portion. Input surface section 106 which allows light emitted from light emitting element 200 to enter inside, is formed in recess section 105. Bottom surface section 101 has three leg sections 103 formed to project outside. When luminous flux control member 100 is mounted on substrate 300, bottom surface section 101 is provided approximately parallel with substrate 300. Further, bottom surface section 101 causes reflected light, which is reflected by light control output surface section 102 of light that is caused to be emitted from input surface section 106, to be emitted outside or reflected back inside again. At the time, in bottom surface section 101, since the reflected light does not uniformly reach in the radial direction (right or left direction in FIG. 4), an offset is caused in the amount of reaching light in the reflected light along the radial direction. Note that the offset of the reflected light in bottom surface section 101 will be described later.

Light control output surface section 102 has an approximately circular and flat surface shape and has a curved surface for controlling the traveling direction of light, which is emitted from light emitting element 200 and enters inside luminous flux control member 100, and causing the light to emit to the illumination-target surface. Further, light control output surface section 102 projects upward beyond collar section 104 (toward the light diffusion member side). Light control output surface section 102 is composed of first output surface 102a, second output surface 102b continuously formed around first output surface 102a, and third output surface 102c for connecting second output surface 102b and collar section 104.

First output surface 102a has a smooth curved shape of a downward recess, that is, has a recessed shape like a ball partly cut off. Further, second output surface 102b is formed continuously to first output surface 102a and has a smooth curved shape of an upward recess, and a flat surface shape of second output surface 102b is formed in an approximately hollow disc shape which surrounds first output surface 102a. Third output surface 102c is formed continuously to second output surface 102b.

Light control output surface section 102 causes the light having entered from input surface section 106 to be refracted and emitted outside. Note that the light having entered from input surface section 106 is not entirely emitted from light control output surface section 102 and partly reflected (Fresnel reflected) back inside by light control output surface section 102.

Leg sections 103 are legs for fixing luminous flux control member 100 at a predetermined position and height and formed so as to project outward from bottom surface section 101. Leg sections 103 are formed around recess section 105 in bottom surface section 101. Three leg sections 103 are formed at intervals and provided at, for example, respective apexes of an isosceles triangle in bottom surface section 101. Leg sections 103 are fixed in substrate 300 by a means such as not shown adhesive, welding, and the like in a state that luminous flux control member 100 is positioned on a front surface of substrate 300. Further, leg sections 103 are provided inside a circle with a circumference on which the position where the amount of light reflected by light control output surface section 102 and yet reaching bottom surface section 101 peaks is located. Preferably, leg sections 103 are provided inside a circle with a circumference on which the position where the amount of light reflected by light control output surface section 102 and yet reaching bottom surface section 101 becomes 20% of a peak is located. Note that the relationship between positions where leg sections 103 are provided and the amount of reflected light reaching bottom surface section 101 will be described later.

Collar section 104 is formed so as to project outward in the radial direction of light control output surface section 102 and has an approximately annular shape.

Recess section 105 has a circular opening shape, is formed in a center portion of bottom surface section 101 when viewed in a plan view, and formed by denting bottom surface section 101 in the direction of light control output surface section 102.

Input surface section 106 has a smooth curved surface, and a cross section of input surface section 106 which is parallel with bottom surface section 101 has a circular shape. Further, input surface section 106 is a surface in which recess section 105 is formed, and receives as input light emitted from external light emitting element 200 mounted on substrate 300.

[Relationship Between Positions of Leg Sections and Amount of Reflected Light Reaching Bottom Surface Section]

Figure 5A:
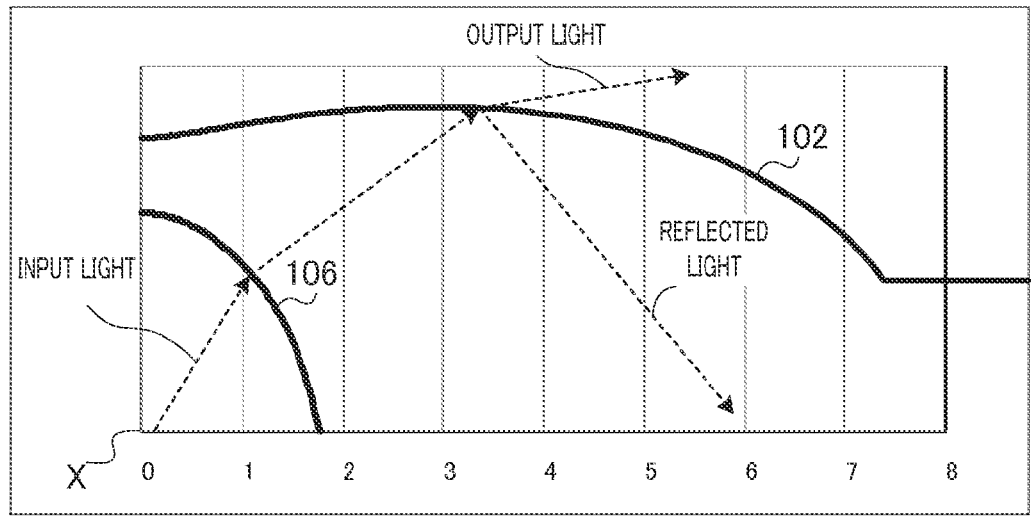
FIG. 5A shows the traveling path of light entering the luminous flux control member in the sectional view of FIG. 4.
Figure 5B:
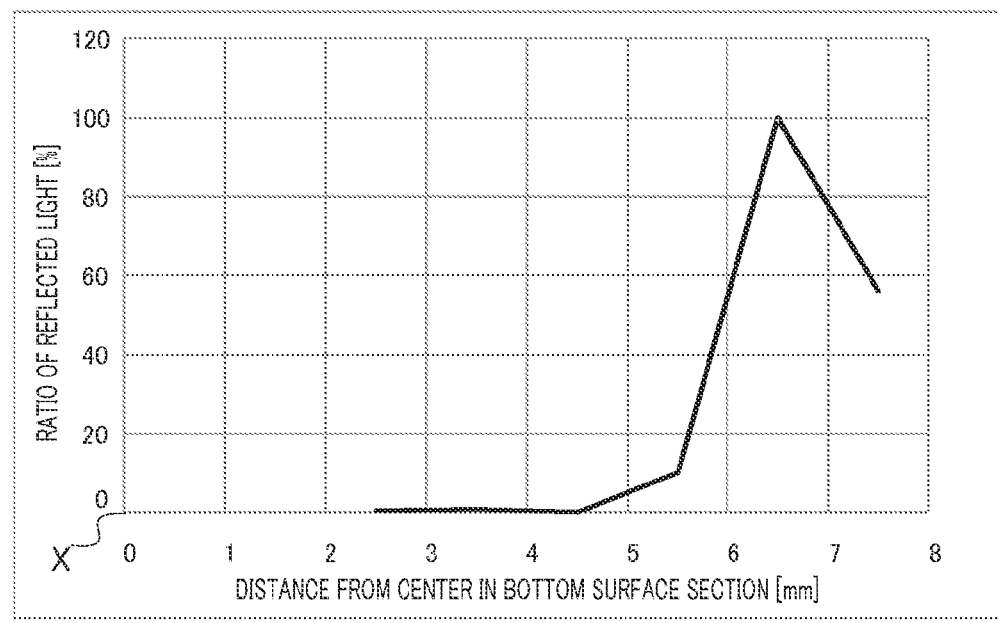
FIG. 5B is a view showing the amounts of reflected light reaching a bottom surface section on a light control output surface in respective positions on the bottom surface section according to an embodiment of the present invention.

Next, the relationship between the positions where leg sections 103 are provided and the amount of reflected light reaching bottom surface section 101 will be described with reference to FIGS. 5A and 5B. FIG. 5A shows the traveling path of light that is received as input in luminous flux control member 100 in a cross-sectional view of FIG. 4, and FIG. 5B is a view showing the amount of light reaching bottom surface section 101 reflected by light control output surface section 102, in respective positions in bottom surface section 101. In FIG. 5A, a solid line shows luminous flux control member 100, and a broken line shows the traveling path of light entering from input surface section 106. In FIGS. 5A and 5B, center X is an intersecting point of a virtual surface extending from bottom surface section 101 and an optical axis of light emitting element 200 and is a center of circular bottom surface section 101 when luminous flux control member 100 is viewed from a bottom surface (see FIG. 3). Further, in FIG. 5B, a ratio of the reflected light of a vertical axis shows a ratio when a peak value of the amount of light reaching bottom surface section 101 is assumed to be 100%.

From FIG. 5B, the amount of reflected light from luminous flux control member 100 reaching bottom surface section 101 with this embodiment is about "0" up to a radius of about 4.5 mm from center X in bottom surface section 101 and becomes 20% or more of a peak in positions beyond a radius of about 5.6 mm from center X.

Further, the amount of reflected light reaching bottom surface section 101 peaks in a position a radius of about 6.5 mm away from center X and is made gradually smaller than the value in a position a radius of about 6.5 mm away from center X toward an outer circumferential direction of bottom surface section 101. Although the position where the amount of reaching light peaks varies depending on the shapes of the input surface and the light control output surface section, the amount of reaching light in reflected light is smaller on the inner side of a peak position than on the outer side of the peak position, by the influence of the traveling direction of light.

From what is described above, in bottom surface section 101, leg sections 103 are formed inside a circumference of a circle which has a radius of about 6.5 mm from center X and where the amount of reaching light in reflected light peaks. By this means, deterioration of optical characteristics, which is caused from the fact that reflected light cannot be used to illuminate a liquid crystal display panel because the reflected light is dispersed by leg sections 103 and absorbed by an adhesive and the like for fixing leg sections 103, can be reduced. Further, preferably, in bottom surface section 101, leg sections 103 are formed inside a circumference of a circle which has a radius of about 5.5 mm from center X and where the amount of reaching light in reflected light becomes 20% or less of a peak. By this means, the deterioration of the optical characteristics can be further reduced.

[Arrangement of Reflection Sheet]

Here, some of surface light source apparatuses are provided with a white reflection sheet to reuse light which is reflected by a light control member, a diffusion sheet, and the like and returns in a direction of a frame (the substrate for mounting).

Figure 6:
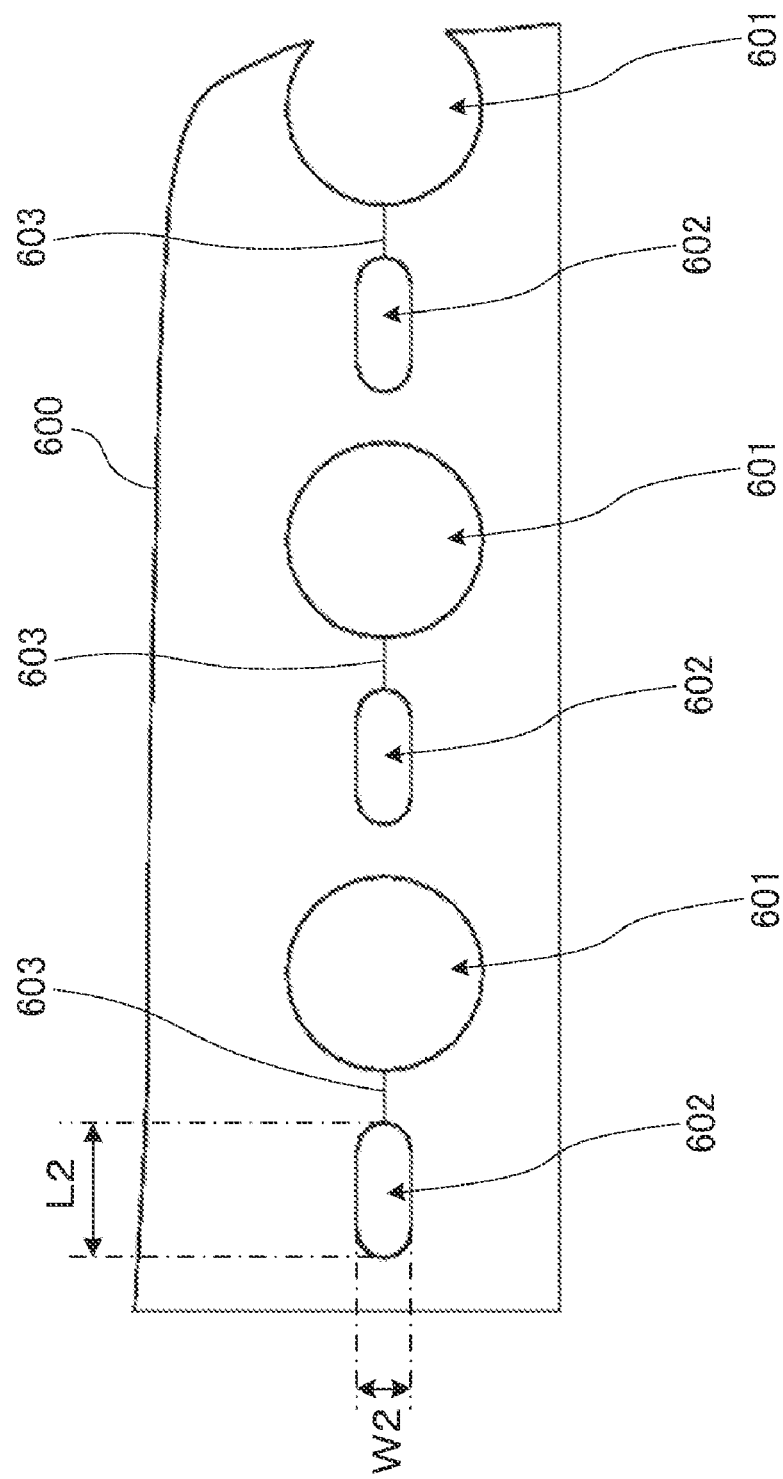
FIG. 6 is a plan view of a part of a lower sheet according to an embodiment of the present invention.

An arrangement of a reflection sheet with this embodiment will be described below with reference to FIGS. 6 and 7. FIG. 6 is a plan view of a part of lower sheet 600, which is a reflection sheet. Further, FIG. 7 is a plan view of upper sheet 700, which is a reflection sheet.

Lower sheet 600 is white and has a plurality of through-holes 601 having a size through which luminous flux control members 100 can pass as shown in FIG. 6. Lower sheet 600 is formed with through-holes 602 corresponding to respective through-holes 601 in the vicinity of through-holes 601. Further, lower sheet 600 is provided with slits 603 for connecting through-holes 601 and through-holes 602. Through-holes 601 have a circular and flat surface shape and a diameter slightly larger than a diameter of luminous flux control member 100 when luminous flux control member 100 is viewed in a plan view. Through-holes 601 which match in number luminous flux control members 100 are formed in lower sheet 600 at positions corresponding to luminous flux control members 100. Through-holes 602 have a slot flat surface shape. Through-holes 602 are formed to have lateral length L2 that is slightly greater than length L1 between two leg sections 103 (see FIG. 3) and longitudinal length W2 that is slightly greater than length W1 between two leg sections 103 (see FIG. 3). Further, through-holes 602 which match in number luminous flux control members 100 are formed in lower sheet 600 at positions corresponding to light emitting elements 200 and leg sections 103. Lower sheet 600 having the above configuration can increase the reflectance of light by covering substrate 300 even if substrate 300 has color other than white such as green, ocher, and the like which is liable to absorb light.

Figure 7:
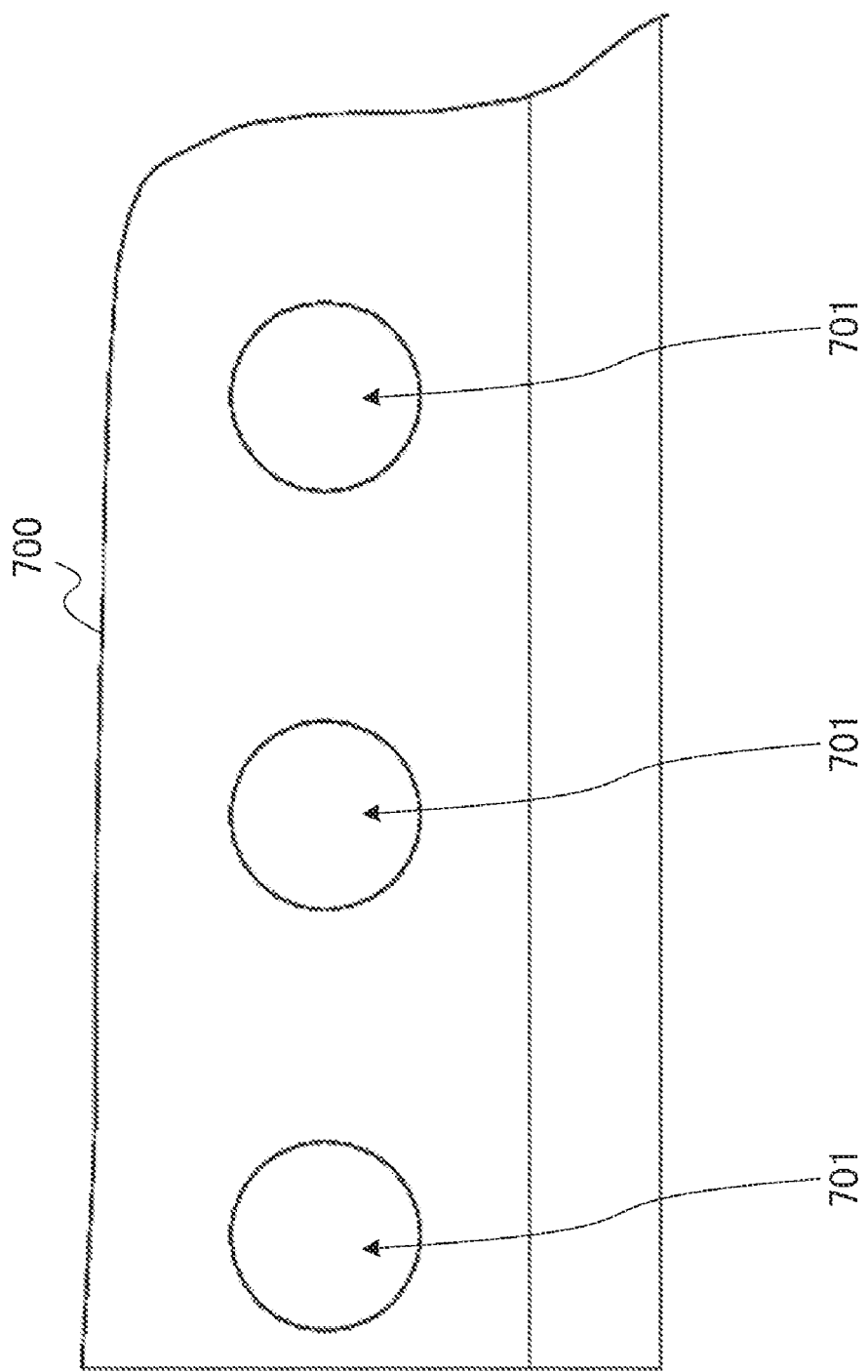
FIG. 7 is a plan view of a part of an upper sheet according to an embodiment of the present invention.

Upper sheet 700 is white and formed with a plurality of through-holes 701 having a size through which luminous flux control members 100 can pass as shown in FIG. 7. Through-holes 701 have a circular and flat surface shape and have a diameter slightly larger than the diameter of luminous flux control member 100 when luminous flux control member 100 is viewed in a plan view. Further, through-holes 701 which match in number luminous flux control members 100 are formed at the positions corresponding to luminous flux control members 100 in upper sheet 700. Upper sheet 700 having the above configuration can increase the reflectance of light by covering substrate 300 which is exposed from through-holes 601 formed to lower sheet 600 to prevent interference with luminous flux control members 100.

[Assembly Method of Surface Light Source Apparatus]

Figure 8:
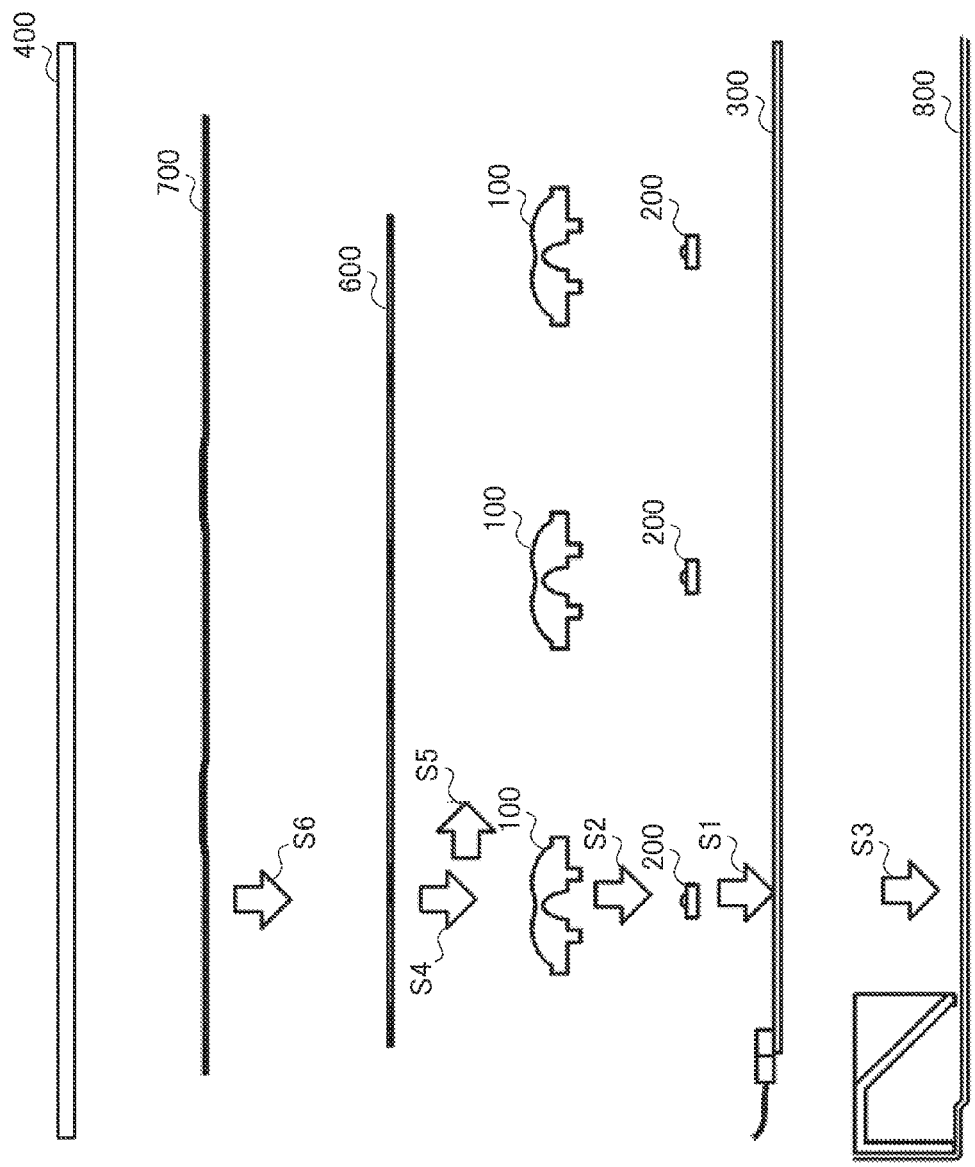
FIG. 8 shows a method of assembling a surface light source apparatus according to an embodiment of the present invention.

Next, an assembly method of the surface light source apparatus to which luminous flux control members 100 is attached will be described with reference to FIG. 8. FIG. 8 is a view showing the assembly method of the surface light source apparatus to which luminous flux control members 100 are attached.

First, light emitting elements 200 are mounted on substrate 300 (S1).

Next, luminous flux control members 100 are mounted on substrate 300 (S2). At the time, each light emitting element 200 is aligned with a center of recess section 105. Further, leg sections 103 are adhered to substrate 300 by an adhesive.

Next, substrate 300, on which light emitting elements 200 and luminous flux control members 100 are mounted, is accommodated in frame 800 and fixed in a predetermined position of frame 800 (S3).

Next, substrate 300 is covered with lower sheet 600 from thereabove (S4). Lower sheet 600 is provided with through-holes 601 which are punched in a size of luminous flux control members 100 so as not to be interfered with luminous flux control members 100. Accordingly, upon covering substrate 300 with lower sheet 600, substrate 300 can be covered with lower sheet 600 without interfering with luminous flux control members 100 by that luminous flux control members 100 pass through through-holes 601.

Next, lower sheet 600 is slid in a direction parallel with a longitudinal direction of substrate 300 (a right direction in FIG. 6) until leg sections 103 of luminous flux control members 100 move from through-holes 601 to through-holes 602 (S5). Lower sheet 600 is provided with slits 603 connecting to through-holes 601. When lower sheet 600 is slid in the direction parallel with the longitudinal direction of substrate 300 so that leg sections 103 move inside slits 603, luminous flux control members 100 can be positioned above through-holes 602 and light emitting elements 200 and leg sections 103 can be positioned in through-holes 602. Further, a part of substrate 300 is exposed outside from through-holes 601 by sliding lower sheet 600 in a direction parallel with the longitudinal direction of substrate 300.

Next, to cover substrate 300 exposed outside from through-holes 601, lower sheet 600 is covered with upper sheet 700 from thereabove (S6). Upper sheet 700 is provided with through-holes 701 which are punched in a size of luminous flux control members 100 so as not to be interfered with luminous flux control members 100 likewise lower sheet 600. Accordingly, when lower sheet 600 is covered with upper sheet 700, lower sheet 600 can be covered with upper sheet 700 without being interfered with luminous flux control members 100 by that luminous flux control members 100 pass through through-holes 701. Further, through-holes 601 of lower sheet 600 can be closed by covering lower sheet 600 with upper sheet 700.

Further, after lower sheet 600 is covered with upper sheet 700, light diffusion member 400 is arranged in a state that a gap is formed between upper sheet 700 and luminous flux control members 100.

Figure 9:
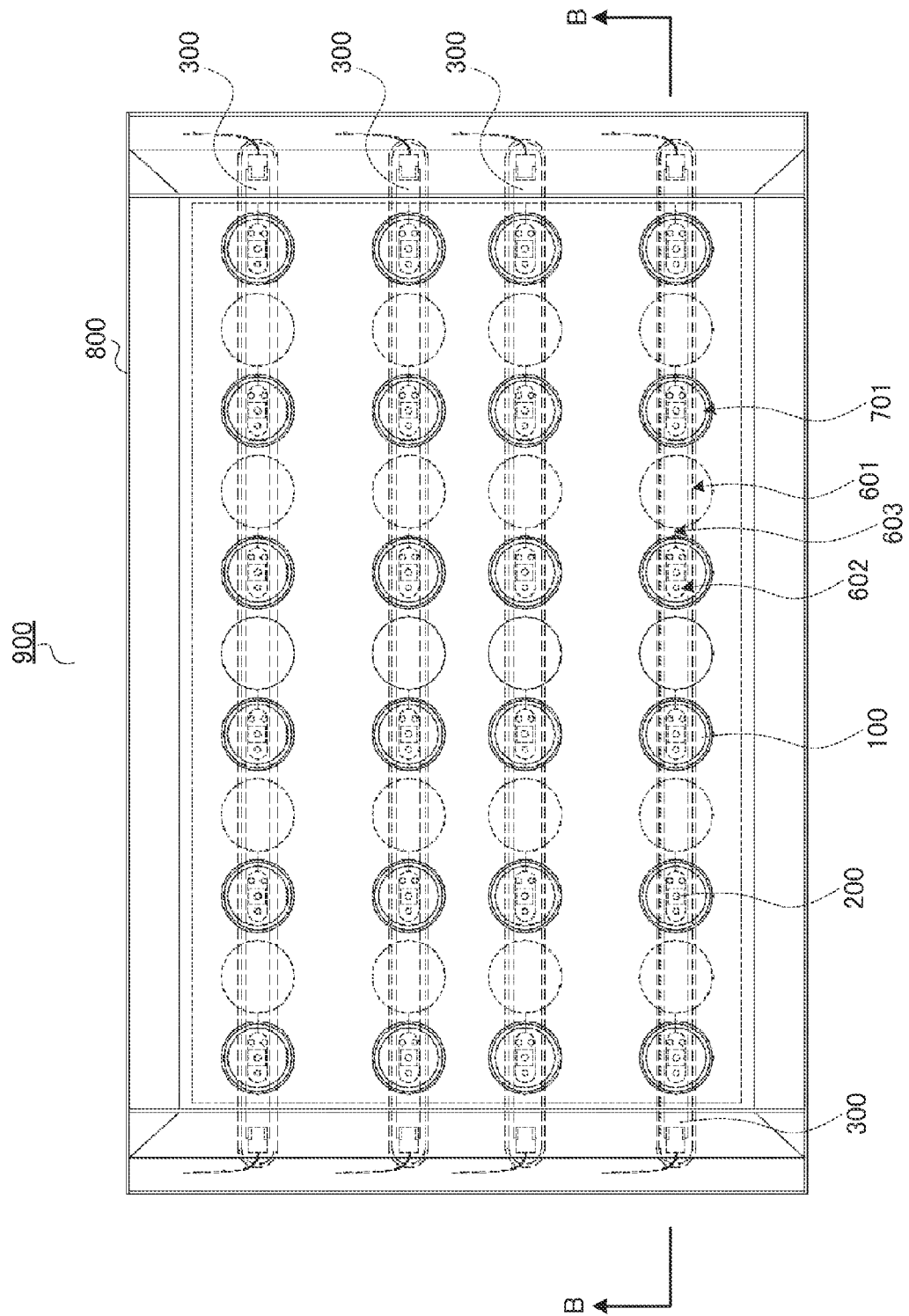
FIG. 9 is a plan view of the surface light source apparatus according to an embodiment of the present invention.

FIG. 9 is a plan view of surface light source apparatus 900 in a state that light diffusion member 400 is removed from surface light source apparatus 900 assembled by the assembly method shown in FIG. 8. Further, FIG. 10 is a cross-sectional view of display apparatus 1000 which is taken along a B-B line in FIG. 9 and in which liquid crystal panel 1001 as an illumination-target member to be illuminated by light from light diffusion member 400 and by light from surface light source apparatus 900 is attached to surface light source apparatus 900.

Figure 10:
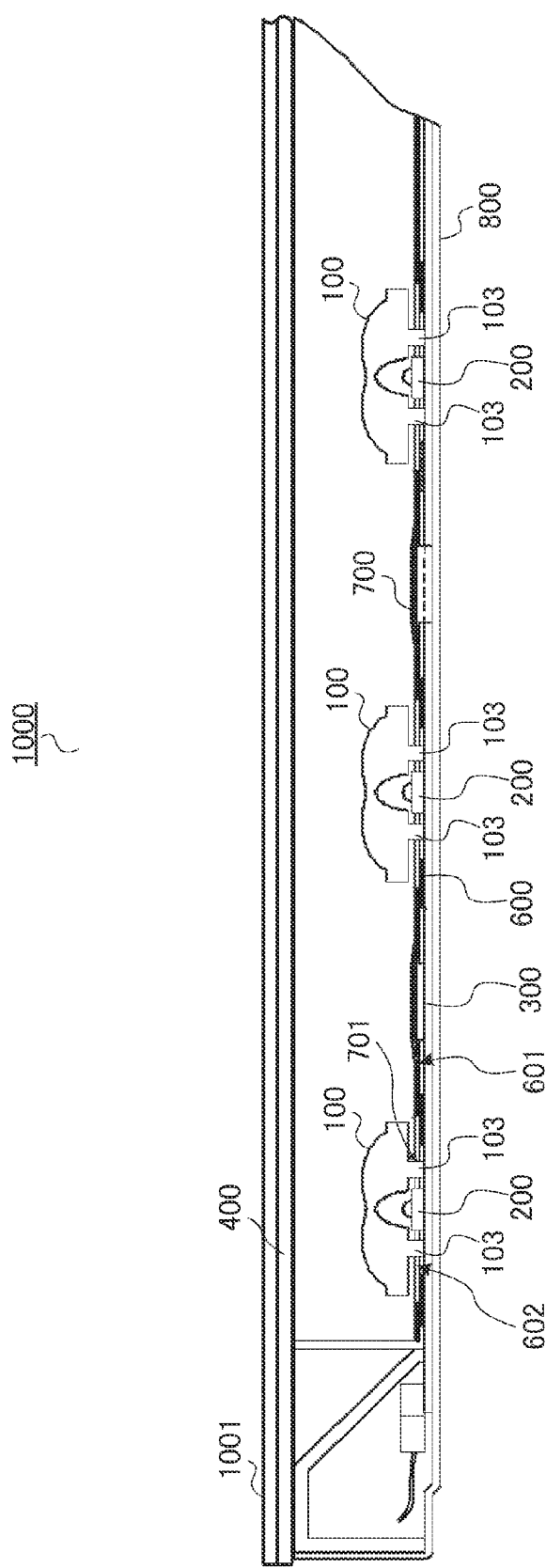
FIG. 10 is a cross-sectional view taken along a B-B line in FIG. 9 of a display apparatus in which a liquid crystal panel as an illumination-target member to be illuminated by light from a diffusion member and the surface light source apparatus is attached to the surface light source apparatus.

As shown in FIGS. 9 and 10, surface light source apparatus 900 can prevent a state that substrate 300 is exposed outside from through-holes 601 by closing through-holes 601 of lower sheet 600 by upper sheet 700. Since leg sections 103 are provided inside a circle having a circumference on which there is the position where the amount of light reflected by light control output surface section 102 and yet reaching bottom surface section 101 peaks, the size of through-holes 602 of lower sheet 600 can be made small. Further, since leg sections 103 are provided inside a circle having a circumference on which the position where the amount of light reflected by light control output surface section 102 and yet reaching bottom surface section 101 peaks is located, when surface light source apparatus 900 is viewed in a plan view as shown in FIG. 9, luminous flux control members 100 are attached to substrate 300 running off substrate 300.

Note that a part of substrate 300 exposed from through-holes 602 is used to prevent interference of portions where luminous flux control members 100 are attached to substrate 300 with substrate 300. In the present invention, as described above, the areas of the exposed sections of through-holes 602 corresponding to the attachment portions can be reduced by sophisticating the positions where leg sections 103 are formed. Therefore, it is not necessary to use a substrate having a white resist of a high light reflectance, and general substrate 300 having green or ocher resist can be used. When an adhesive having color different from resist color is used, a leakage of a coated adhesive can be easily detected in assembly step. Accordingly, when general substrate 300 having green or ocher resist is used, a white adhesive can be used. In contrast, when a substrate having a white resist is used, it is difficult to use a white adhesive. When a black adhesive is used, there is a disadvantage that light is absorbed thereby.

[Variation of Reflection Sheet]

Figure 11:
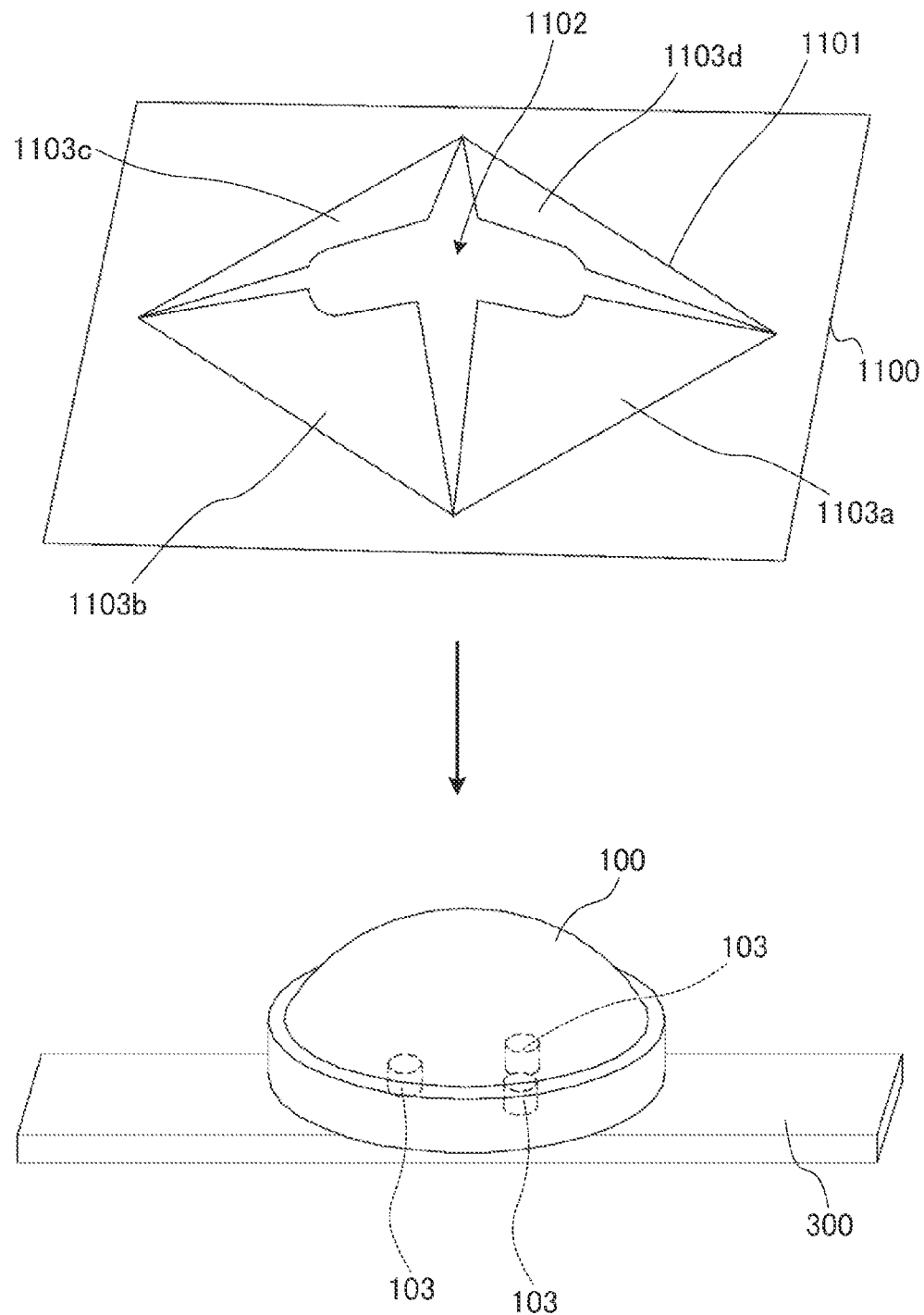
FIG. 11 is a perspective view showing a state before another reflection sheet according to an embodiment of the present invention is attached to a substrate.
Figure 12:
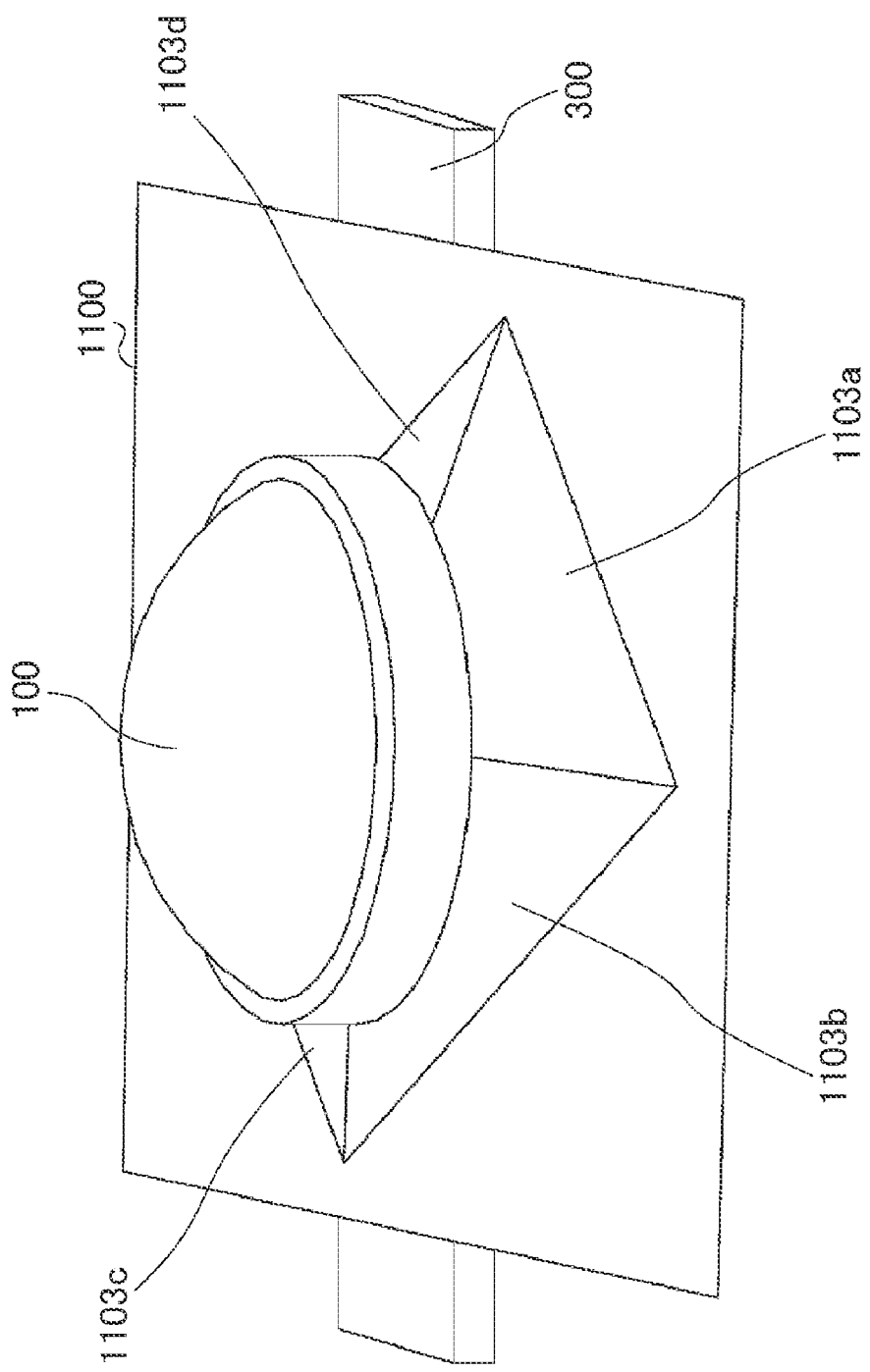
FIG. 12 is a perspective view showing a state after another reflection sheet according to an embodiment of the present invention is attached to the substrate.

Next, another arrangement of the reflection sheet will be described with reference to FIGS. 11 and 12. FIG. 11 is a perspective view of a state before another reflection sheet 1100 is attached to substrate 300. Further, FIG. 12 is a perspective view of a state after another reflection sheet 1100 is attached to substrate 300. Note that, in FIGS. 11 and 12, the sections having the same arrangement as that of FIGS. 1 to 10 are denoted by the same reference numerals and description thereof will not be repeated here. in FIGS. 11 and 12, a frame is omitted for the purpose of convenience of explanation.

From FIGS. 11 and 12, reflection sheet 1100 has slit 1102 formed on diagonal lines of square bent section 1101 when viewed in a plan view. Further, reflection sheet 1100 has bent and raised sections 1103a-1103d which are bent and raised upward from bent section 1101. Bent and raised sections 1103a- to 1103d are formed by being bent and raised from respective sides of a square that forms bent section 1101.

Reflection sheet 1100 is placed in a state shown in FIG. 12 by that luminous flux control members 100 are aligned so as to pass through slit 1102 and luminous flux control members 100 are covered with reflection sheet 1100 from thereabove. More specifically, bent and raised sections 1103a- to 1103d are located under a back side where bottom surface sections 101 of flux control members 100 are formed in such a manner that, after luminous flux control members 100 pass through slit 1102, bent and raised sections 1103a- to 1103d return in a direction opposite to a bending and raising direction. Accordingly, when reflection sheet 1100 is used, an area of substrate 300 which is exposed outside from slit 1102 can be minimized without using the two sheets of the lower sheet and the upper sheet.

Figure 13:
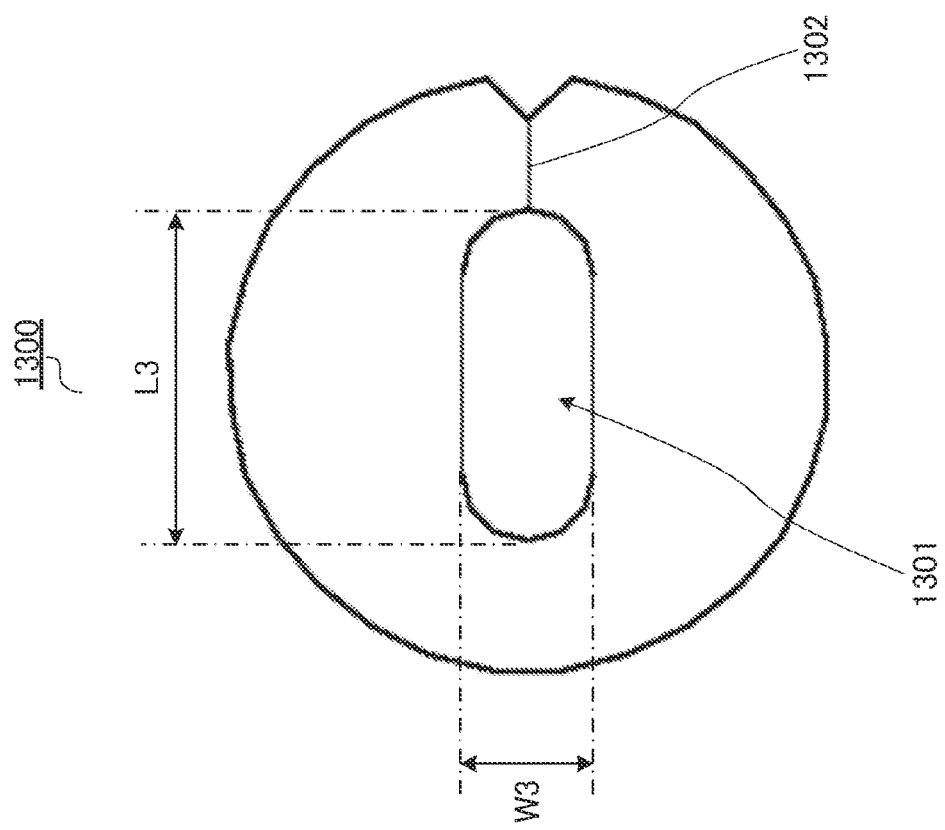
FIG. 13 is a plan view of yet another lower sheet according to an embodiment of the present invention.

Next, yet another arrangement of the reflection sheet will be described with reference to FIG. 13. FIG. 13 is a plan view of the yet another lower sheet 1300. Note that since an upper sheet has the same arrangement as that shown in FIG. 7, description thereof will not be repeated here.

From FIG. 13, lower sheet 1300 has a circular and flat surface shape and slot section 1301, which is a through-hole in a center portion. Further, slot section 1301 has a lateral length L3 that is slightly greater than length L1 between two leg sections 103 (see FIG. 3) and longitudinal length W3 that is slightly greater than length W1 between two leg sections 103 (see FIG. 3).

Portions of substrate 300 where luminous flux control members 100 are attached are covered with lower sheet 1300 by sliding lower sheet 1300 until leg sections 103 of luminous flux control members 100 move inside slit 1302 and reach slot section 1301.

Figure 14:
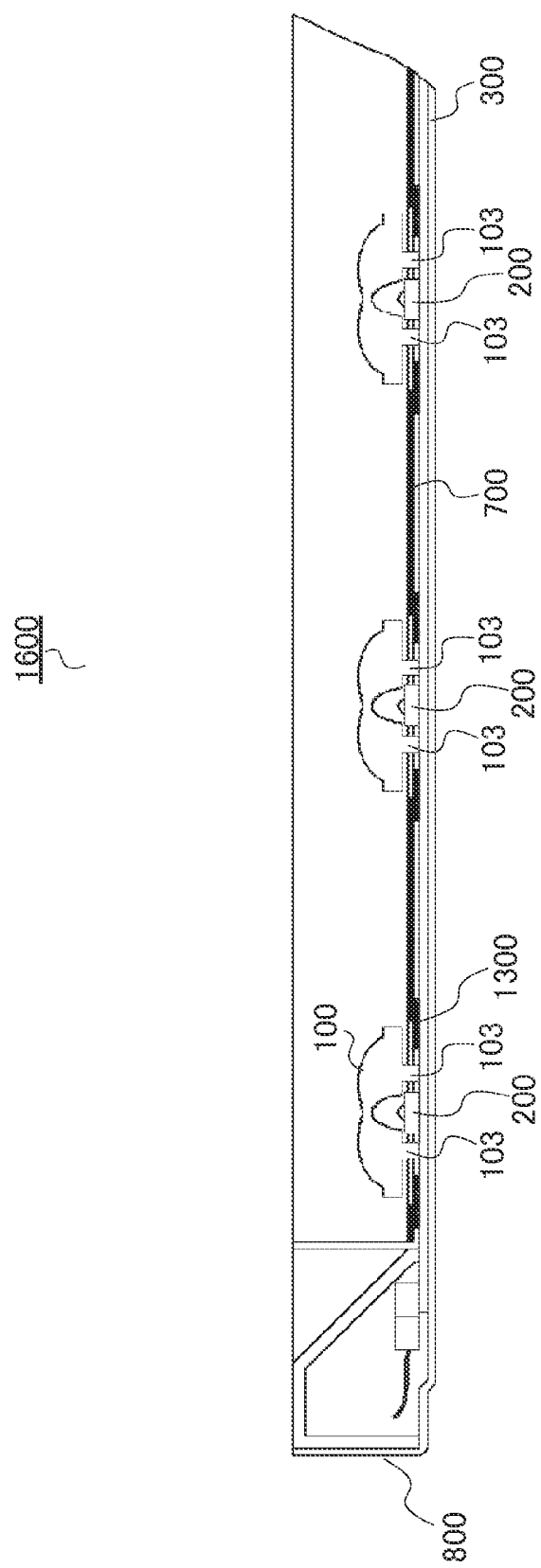
FIG. 14 a view showing a method of assembling another surface light source apparatus according to an embodiment of the present invention.

FIG. 14 is a cross-sectional view of another surface light source apparatus 1600 using lower sheet 1300 and upper sheet 700. Note that, since surface light source apparatus 1600 has the same arrangement as surface light source apparatus 900 of FIG. 9 and of FIG. 10 except that lower sheet 1300 is used in place of lower sheet 600, description thereof will not be repeated here.

As shown in FIG. 14, a portion of substrate 300 that is not covered with lower sheet 1300 is covered with upper sheet 700.

EFFECTS OF EMBODIMENT

As described above, with this embodiment, the leg sections are provided inside a circle with a circumference on which the position where the amount of reaching light in reflected light reflected by the light control output surface section and yet reaching the bottom surface section peaks is located. By this means, according to this embodiment, since the width of the substrate can be narrowed, the number of substrates for mounting which can be formed from a single substrate can be increased. Further, according to this embodiment, the deterioration of optical characteristics, which is caused from the fact that the reflected light cannot be used to illuminate the liquid crystal display panel because the reflected light is dispersed by the leg sections, absorbed by the adhesive member, and the like can be reduced. In particular, when the leg sections are provided inside a circle with a circumference on which the position where the amount of reaching light in reflected light reflected by the light control output surface section and yet reaching the bottom surface section becomes 20% or less of a peak is located, the deterioration of the optical characteristics can be more suppressed.

Further, according to this embodiment, since areas in which the luminous flux control members are attached to the substrate can be made small and the substrate is exposed outside only in the areas, it is not necessary to place a white resist of a high reflectance to the substrate and a general substrate using a resist of green and the like can be used, and thus a manufacturing cost can be reduced. Accordingly, when the leg sections are adhered to the substrate, a white adhesive of a high reflectance can be used, thereby the optical characteristics can be improved.

Further, according to this embodiment, the stress applied to the leg sections due to the difference of thermal expansion between the substrate and the luminous flux control member can be reduced. As a result, since an occurrence of crack in the leg sections can be suppressed and the cylindrical leg sections can be thinned by reducing a diameter, the amount of adhesive upon attaching the leg sections to the substrate can be reduced, thereby the manufacturing cost can be reduced.

Note that, although the three leg sections are provided with this embodiment, the present invention is by no means limited thereto and two or four or more leg sections other than the three leg portions may be provided. Also, in this case, all the leg sections are provided inside a circle with a circumference on which the position where the amount of reaching light in reflected light reflected by the light control output surface section and yet reaching the bottom surface section peaks is located. The same effects as those described above can be obtained by providing all the leg sections inside the circle with a circumference on which the position where the amount of reaching light in reflected light reflected by the light control output surface section and yet reaching the bottom surface section becomes 20% or less of a peak is located. Further, with this embodiment, although the three leg sections are provided, respectively at the positions of the respective apexes of the isosceles triangle, the present invention is by no means limited thereto and the three leg sections may be provided at the positions of respective apexes of a regular triangle. Further, the present invention is not limited to the case where the three leg sections are provided at the positions of the respective apexes, respectively, and the three leg sections may be provided on the same circumference at equal intervals. The width of the substrate can be minimized by attaching the luminous flux control members to the substrate with the direction of the leg sections having wide intervals aligned with the longitudinal direction of the substrate. Further, the reflection sheet is not limited to the shapes shown in FIGS. 6, 7, 11, and 13 and may be formed in any shape to prevent the reflection sheet from interfering with the luminous flux control member and allow the reflection sheet to cover the substrate.

The present invention is preferable to a light emitting apparatus used as various types of illuminations, for example, a light source of backlight for illuminating, in a planar fashion, a liquid crystal display panel from the back side, a general indoor illumination, and the like, a surface light source apparatus that uses the light emitting apparatus and is used for various types of illuminations, a display apparatus used in combination with an illumination-target member using the surface light source apparatus as an illumination means, and a luminous flux control member that constitutes the surface light source apparatus and the display apparatus.

What is claimed is:
1. A light emitting apparatus comprising:
a light emitting element mounted on a substrate for emitting light; and
a luminous flux control member,
wherein said luminous flux control member includes a bottom surface section facing the substrate;
an input surface section including an inward recess formed in the bottom surface section at a position right above the light emitting element for receiving the light emitted from the light emitting element;

a light control output surface section for refracting the light from the input surface section, and for emitting the light outside; and at least two leg sections attached to the substrate and projecting outward from the bottom surface section, said at least two leg sections being situated inside a first circumference on the bottom surface section where the light reflected from the light control output surface section has a maximum amount.

2. The light emitting apparatus according to claim 1, wherein said at least two leg sections are situated inside a second circumference on the bottom surface section where the light reflected from the light control output surface section has an amount smaller than the maximum amount by 20%.

3. The light emitting apparatus according to claim 1, wherein said luminous flux control member is attached to the substrate and sticks out of the substrate when viewed in a plan view.

4. A surface light source apparatus comprising:

the light emitting apparatus according to claim 1;

a light diffusion member provided on a side of the light control output surface section to be away from the luminous flux control member; and a light reflection sheet for covering the substrate, said light reflection sheet including a hole for preventing interfere with the light emitting element.

5. A display apparatus comprising the surface light source apparatus according to claim 4 and an illumination-target member for receiving the light from the surface light source apparatus.

6. A luminous flux control member for receiving light emitted from a light emitting element and controlling a traveling direction of the light, comprising:

a bottom surface section facing a substrate;

an input surface section including an inward recess formed in the bottom surface section at a position right above the light emitting element for receiving the light emitted from the light emitting element;

a light control output surface section for refracting the light from the input surface section, and for emitting the light outside; and at least two leg sections attached to the substrate and projecting outward from the bottom surface section, said at least two leg sections being situated inside a circumference on the bottom surface section where the light reflected from the light control output surface section has a maximum amount.

* * * * *